(No Model.)

W. G. MUMMA.
MEAT TENDERER.

No. 544,188.   Patented Aug. 6, 1895.

WITNESSES:
John A. Rennie
Theo. G. Hoskins

INVENTOR
W. G. Mumma
BY
Munn & Co.
ATTORNEYS.

UNITED STATES PATENT OFFICE.

WILLIAM G. MUMMA, OF WARRENSBURG, MISSOURI.

MEAT-TENDERER.

SPECIFICATION forming part of Letters Patent No. 544,188, dated August 6, 1895.

Application filed November 24, 1894. Serial No. 529,800. (No model.)

*To all whom it may concern:*

Be it known that I, WILLIAM G. MUMMA, of Warrensburg, in the county of Johnson and State of Missouri, have invented a new and Improved Meat-Tenderer, of which the following is a full, clear, and exact description.

The object of my invention is to provide a new and improved meat-tenderer which is comparatively simple and durable in construction, arranged to tender every part of the meat, and to prevent the latter from clinging to the cutters when the device is used.

The invention consists, principally, of a device for raising the cutter-head to lift the cutters out of the meat.

The invention also consists in certain parts and details and combinations of the same, as will be hereinafter fully described, and then pointed out in the claims.

Reference is to be had to the accompanying drawings, forming a part of this specification, in which similar letters of reference indicate corresponding parts in both views.

Figure 1:
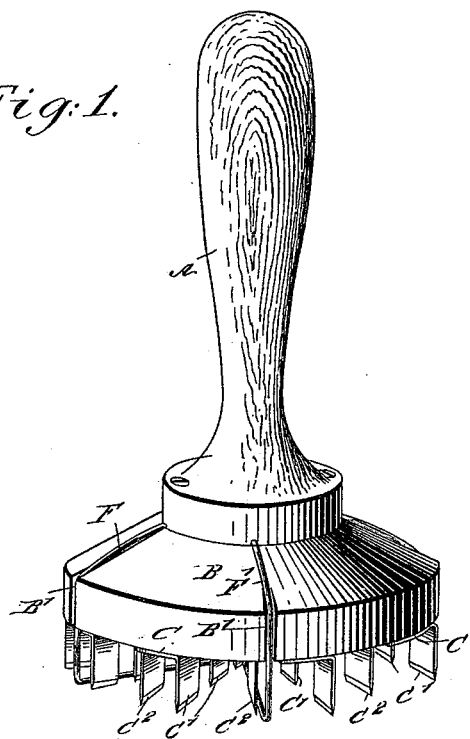
Figure 2:
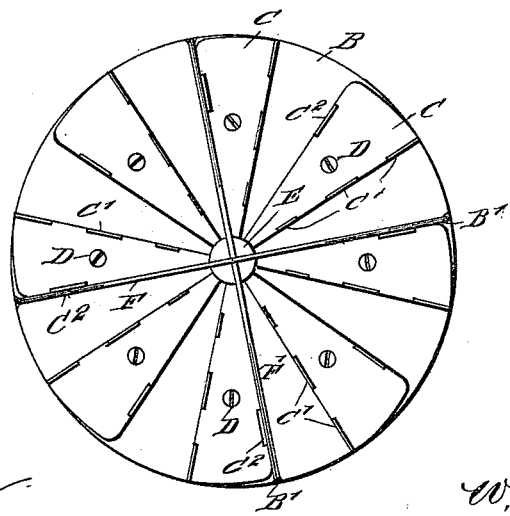

Figure 1 is a perspective view of the improvement, and Fig. 2 is an enlarged inverted plan view of the same.

The improved meat-tenderer is provided with a handle A, on which is fastened a cutter-head B, preferably made circular in shape, and carrying at its under side a number of radially-arranged cutter-blades C, each secured in position on the head by a screw D and a central screw E, engaging with its head the inner ends of all the blades C. Each of the latter is provided on one side with a series of turned-up cutters C', depending downwardly and arranged in alignment and radially from the center of the cutter-head. On the other side of each blade C is turned up another cutter $C^2$, which stands at an angle to the series of cutters C'. A sufficient space is left between two adjacent cutter-blades C to distribute the various cutters C' and $C^2$ of the blade C uniformly on the under side of the cutter-head B.

In order to lift the cutter-head B to raise the free lower ends of the cutters C' and $C^2$ out of the meat, after the operator releases the pressure on the handle A, I provide the spring-wires F and F', extending diametrically across the under side of the cutter-head, about in alignment with the sharpened lower edges of the cutters C' and $C^2$. The wires F and F' cross each other approximately at right angles, and are then bent upwardly to pass through grooves B', in the side of the cutter-head B, to the top thereof, on which they are fastened in any suitable manner.

Now it will be seen that when the tenderer is used, in the usual manner, by the operator striking the meat with the cutters C' and $C^2$, then on the downward movement of the cutter-head the spring-wires F and F' are pressed or bent upwardly, and as soon as the operator releases the pressure on the handle A, then the said spring-wires in assuming their normal position lift the cutter-head to raise the cutting-edges of the cutters C' and $C^2$ out of the meat. By this arrangement the meat is prevented from clinging to the cutters.

It will further be seen that the meat-tenderer is very simple and durable in construction, is easily handled, and by its large number of cutters permits of cutting the meat very rapidly.

Having thus described my invention, I claim as new and desire to secure by Letters Patent—

1. A meat tenderer, comprising a handled head formed with grooves in its margin, a series of depending cutters secured on the under side of the said head, and a raising device formed of spring wires crossing each other beneath the head, the said wires engaging the said grooves and having their ends secured to the head, substantially as shown and described.

2. A meat tenderer, comprising a handled head, a series of radially arranged cutter blades spaced apart and secured to the under side of the said head, the said blades decreasing in width toward the center of said cutter head and sets of cutters turned upon the said blades and extending downwardly therefrom, the said cutters being arranged radially from the center of the cutter head, substantially as shown and described.

3. A meat tenderer, comprising a handled head, a series of radially arranged cutter blades secured to the under side of the said head, sets of cutters turned up on the said blades and extending downwardly therefrom, a screw for each blade to fasten the latter to the cutter head, and a second screw screwing in the said head and engaging and holding with its head the inner ends of all the radially arranged cutter blades, substantially as shown and described.

4. A meat tenderer, comprising a handled head, a series of cutters on the under side thereof, and a raising device consisting of the spring wires extending across the under side of the cutter head, and crossing each other approximately at right angles beneath the head, the said wires being bent upwardly and passing through grooves in the sides of the cutter head, and the ends of the said wires being secured to the top of the said cutter head, substantially as shown and described.

WILLIAM G. MUMMA.

Witnesses:
JOHN G. MILLER,
GEORGE G. BURNETT.